(12) United States Patent
Koe

(10) Patent No.: US 6,586,969 B1
(45) Date of Patent: Jul. 1, 2003

(54) METHOD AND SYSTEM FOR SYNCHRONOUSLY INITIALIZING DIGITAL LOGIC CIRCUITS

(75) Inventor: Wern-Yan Koe, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/107,496

(22) Filed: Mar. 25, 2002

(51) Int. Cl.[7] ............................................. H03K 19/00
(52) U.S. Cl. ........................................... 326/93; 326/38
(58) Field of Search ........................ 326/93–98, 37–38, 326/46, 21

(56) References Cited

U.S. PATENT DOCUMENTS

| | | | |
|---|---|---|---|
| 5,300,831 A | * | 4/1994 | Pham et al. .................. 326/44 |
| 6,069,496 A | * | 5/2000 | Perez .......................... 326/98 |
| 6,078,193 A | * | 6/2000 | Bazuin et al. ................ 326/93 |
| 6,356,117 B1 | * | 3/2002 | Sutherland et al. ........... 326/93 |
| 6,420,905 B1 | * | 7/2002 | Davis et al. ................. 326/113 |

* cited by examiner

*Primary Examiner*—Don Le
(74) *Attorney, Agent, or Firm*—Thelen Reid & Priest LLP

(57) ABSTRACT

A digital system in a first clock domain synchronously initializes a logic circuit having a memory characteristic. The digital system includes first and second logic circuits. The first circuit includes an asynchronous port for receiving a reset signal from a second clock domain, a port for receiving a first clock signal for the first clock domain, and an output port for providing an initialization signal. The first circuit sets the initialization signal at a first logic value in response to the reset signal and maintains the first logic value at least until the first clock signal becomes active. The second circuit includes a synchronous port for receiving the initialization signal, a port for receiving the first clock signal, and a data output port outputting a data signal. The second circuit is initialized in response to the active first clock signal when the initialization signal has the first logic value.

20 Claims, 4 Drawing Sheets

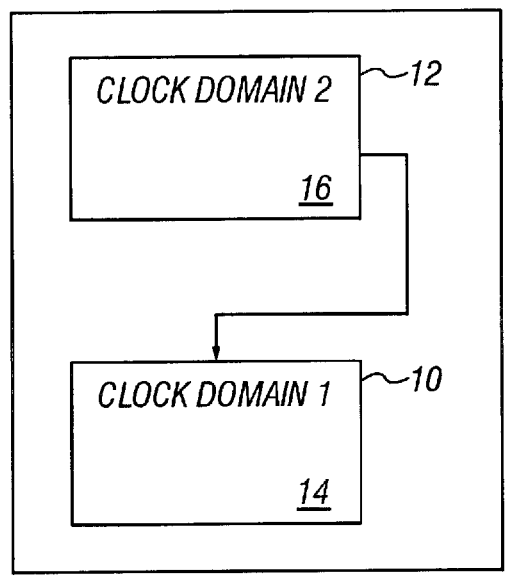
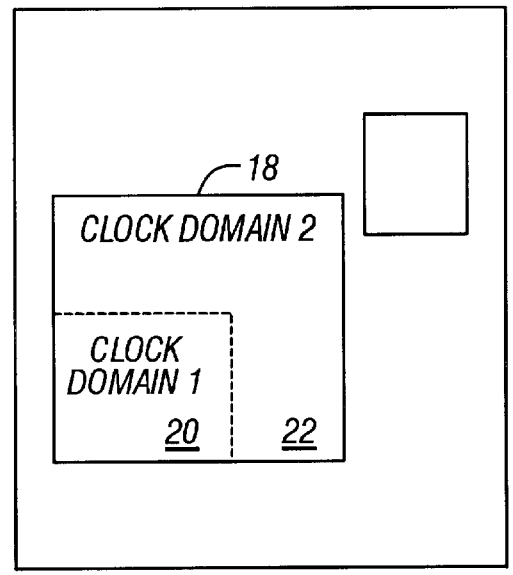
FIG. 1A
FIG. 1B
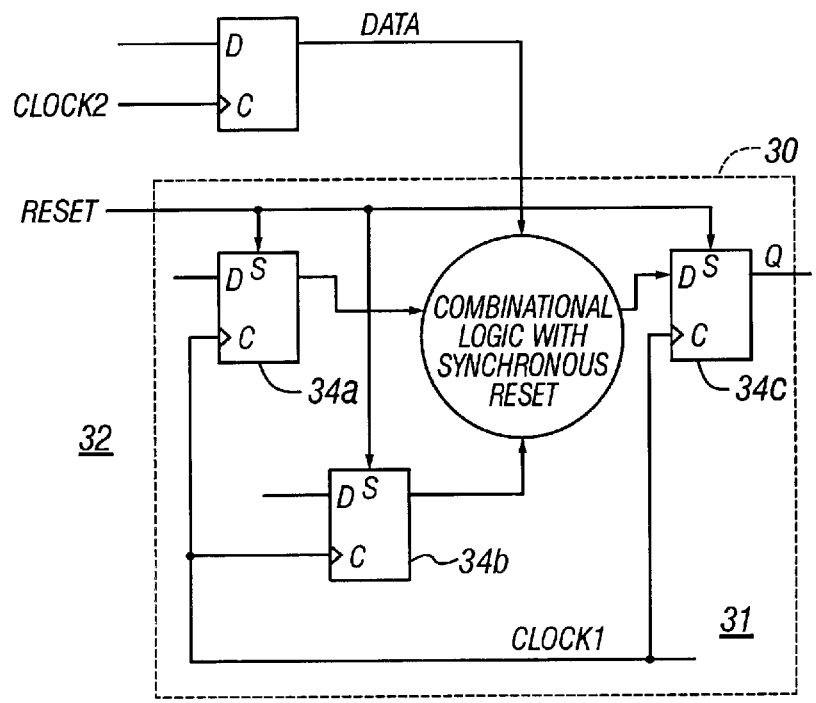
FIG. 2
*(Prior Art)*

METHOD AND SYSTEM FOR SYNCHRONOUSLY INITIALIZING DIGITAL LOGIC CIRCUITS

FIELD OF THE INVENTION

The present invention relates to digital systems. More particularly, the present invention relates to initialization of digital logic circuits having a memory characteristic.

BACKGROUND OF THE INVENTION

A digital system, such as a digital application specific integrated circuit (ASIC), typically includes both combinational logic circuits and memory elements. A combinational logic circuit, which is made up of combinations of logic gates, has no memory characteristic and thus its output depends only on the current value of its inputs. Flip-flops are typical memory elements used for sequential logic such as registers, counters, and finite state machines (FSM). When such a digital system is powered up, or needs to be reset, all the flip-flops need to be initialized so as place the system to a known initialized (or default) state.

A reset signal, often referred to as a system reset signal or global reset signal, is typically employed to initialize the digital system. A reset signal may be automatically generated when an ASIC or a device containing the ASIC is powered up. A reset signal may also be generated when the digital system needs to be re-initialized, for example, when the system is rebooted, or when the system starts communicating with another system. The reset signal can be applied to flip-flops either synchronously or asynchronously. In an asynchronous reset, a reset signal is applied to an asynchronous port, typically a reset (RST) port or preset (SET) port, of each flip-flop of the system. The initialization is not in synchronism with a clock signal for the system. On the other hand, in a synchronous reset, a reset signal is applied to a synchronous control port of each flip-flop, and the flip-flops of the system are initialized in synchronism with the system's clock signal.

In an embedded system, such as a system-on-a-chip architecture, various processors or circuit cores are integrated on a single chip, and there are many clock domains. For example, as shown in FIG. 1A, a first circuit core 10 and a second circuit core 12 may be in different clock domains 14 and 16, respectively. Also, as shown in FIG. 1B, a circuit core 18 may have a plurality of clock domains 20 and 22. When circuitry in one clock domain is initialized by a reset signal from outside of the clock domain, a clock signal necessary for synchronous initialization of that clock domain may not be readily available. For example, as shown in FIG. 1A, when the first circuit core 10 is initialized by the second circuit core 12, a reset signal is sent from the second circuit core 12 and a clock signal for the first circuit core 10 is also activated. Such a clock signal for the first clock domain 14 may be generated within the first circuit core 10 or supplied as a peripheral or external clock signal. However, when the first circuit core 10 is in the initialization phase after receiving the reset signal, the clock signal may not have started toggling so as to properly trigger the initialization.

Accordingly, since a synchronous reset may not properly initialize circuitry in one clock domain, asynchronous initialization has been employed in a conventional digital system. That is, all memory elements such as flip-flops of the circuit core 10, or in the same clock domain of the core 18, are reset asynchronously in a conventional system. FIG. 2 schematically illustrates such a conventional digital system 30 employing an asynchronous reset scheme. As shown in FIG. 2, the digital system 30 is in a first clock domain 31 (with clock signal Clock 1). A reset signal (Reset) and a data signal (Data) which typically follows the reset signal are provided from a second clock domain 32 (with clock signal Clock 2). The reset signal is supplied to all of the time-sensitive digital logic circuits 34 (34a–34c) in the first clock domain 31. The digital logic circuits 34 are typically asynchronous-reset flip-flops.

FIG. 3 schematically illustrates signal waveforms in the conventional asynchronous initialization. As shown in FIG. 3, the reset signal Reset (waveform 40) is activated at time $t_1$ and then deactivated at time $t_2$. The time period from time $t_1$ to time $t_2$ is an initialization sequence, and may have a specific number of cycles of the clock signal Clock 2 (waveform 42). However, the clock signal Clock 1 (waveform 44) for a synchronized operation is not available until time $t_3$ after the initialization sequence has already past. Thus, it is necessary that a timing-sensitive digital logic circuit (such as a flop-flop) is asynchronously initialized in response to activation of the reset signal Reset at time $t_1$. The output (Q) of the flip-flop (waveform 46) has an invalid value until time $t_1$ when the flip-flop is initialized. Then, when the clock signal Clock 1 becomes active at time $t_3$, the flip-flop begins outputting a valid functional value.

In order to asynchronously reset a digital logic circuit, it needs to have an asynchronous port. However, for example, an asynchronous-reset flip-flops with an asynchronous port is larger than a synchronous-reset flip-flop. Also, an asynchronous reset signal has to be connected to a number of asynchronous flip-flops in the system. The large-sized asynchronous-reset flip-flops and a reset signal bus with many fanouts require a larger area of the chip. In addition, a large number of fanouts add the loading on the reset signal. Under heavy loading, the pulse of the reset signal may set the flip-flops closer to the source, but it would be so attenuated by a long bus wiring that it is invisible to other fanouts far away from the source. Alternatively, if the active clock signal should be provided at the-time when the reset signal is active, additional logic is required, increasing the cost and die area.

Accordingly, it would be desirable to provide a method and system for synchronously initializing a digital circuit system with a minimal number of asynchronous-reset flip-flops, so as to save the die area and reduce loading on the reset signal.

BRIEF DESCRIPTION OF THE INVENTION

A method and digital system synchronously initialize a logic circuit having a memory characteristic. The digital system is in a first clock domain. The digital system includes a first logic circuit and a second logic circuit. The first logic circuit includes an asynchronous port for receiving a reset signal from a second clock domain, a port for receiving a first clock signal for the first clock domain, and an output port for providing an initialization signal. The first logic circuit sets the initialization signal at a first logic value in response to the reset signal and maintains the first logic value at least until the first clock signal becomes active. The second logic circuit includes a synchronous port for receiving the initialization signal, a port for receiving the first clock signal, and a data output port outputting a data signal. The second logic circuit is initialized in response to the active first clock signal when the initialization signal has the first logic value. The method includes (a) receiving a reset signal from a second clock domain, (b) activating the initialization signal in response to the reset signal, (c) maintaining the initialization signal active at least until the first clock signal becomes active, (d) initializing the digital logic circuit in response to the first clock signal when the first clock signal becomes active, and (e) deactivating the initialization signal in response to the active first clock signal.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 1A and 1B are block diagrams schematically illustrating examples of a system with multiple clock domains.

FIG. 2 is an electrical block diagram schematically illustrating a conventional digital system employing an asynchronous initialization scheme.

DETAILED DESCRIPTION

Embodiments of the present invention are described herein in the context of a method and system for synchronously initializing digital logic circuits. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
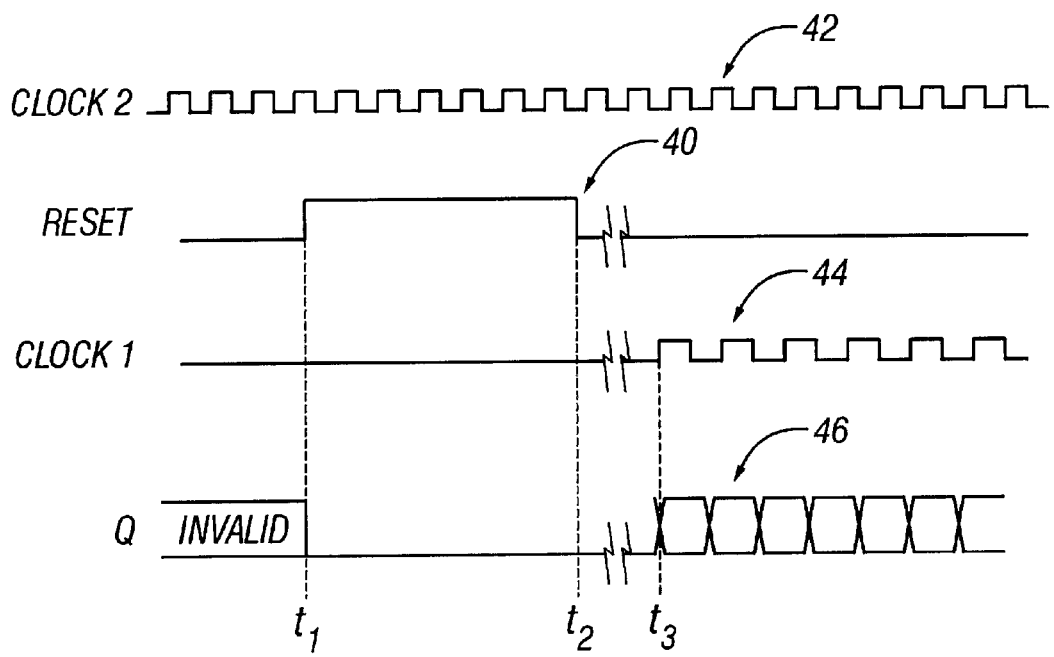
FIG. 3 is a diagram schematically illustrating signal waveforms in the conventional asynchronous initialization system.
Figure 4:
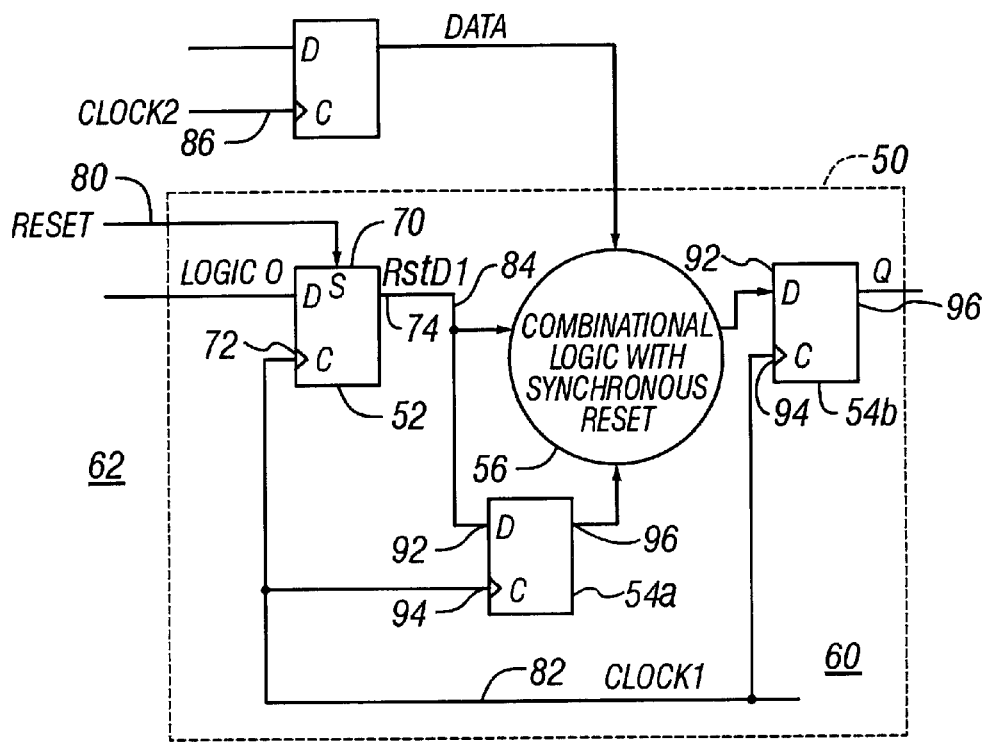
FIG. 4 is an electrical block diagram schematically illustrating a digital system capable of synchronous initialization in accordance with one embodiment of the present invention.

FIG. 4 schematically illustrates a digital system 50 capable of synchronous initialization of a logic circuit having a memory characteristic, in accordance with one embodiment of the present invention. The logic circuit with a memory characteristic includes, for example, a flip-flop and any other timing-sensitive digital logic circuit. The digital system 50 is in a first clock domain 60, and may receive a data signal from outside of the first clock domain 60, for example, from a second clock domain 62. The digital system 50 includes a first logic circuit 52 and at least one second logic circuit 54 (54a and 54b, for example). Typically, the digital system 50 also includes combinational logic 56 which does not have a memory characteristic and is not timing sensitive. The data signal from the second clock domain 62 is typically supplied to the combinational logic 56. The operation of circuitry in the first clock domain 60 is clocked by a first clock signal (Clock 1) 82, and that in the second lock domain 62 is clocked by a second clock signal (Clock 2) 86.

The first logic circuit 54 is an asynchronous-reset circuit having a memory characteristic, such as an asynchronous flip-flop, FSM, or the like. The first logic circuit 54 has an asynchronous port 70 for receiving a reset signal (Reset) 80 from outside of the first clock domain 60, for example, from the second clock domain 62. The first logic circuit 54 also has a clock port 72 for receiving the first clock signal (Clock 1) 82, and an output port 74 for providing an initialization signal (Rst D1) 84. The first clock signal 82 may be generated within the first clock domain 60, or may be a peripheral clock signal supplied from outside of the first clock domain 60. The second logic circuit 54 includes a synchronous port 92 for receiving the initialization signal (RstD1) 84, a clock port 94 for receiving the first clock signal 82, and a data output port 96 outputting a data signal. As shown in FIG. 4, the initialization signal 84 from the first logic circuit 52 may be supplied directly to the second logic circuit 54a, or to the second logic circuit 54b through the combinational logic 56.

Figure 5:
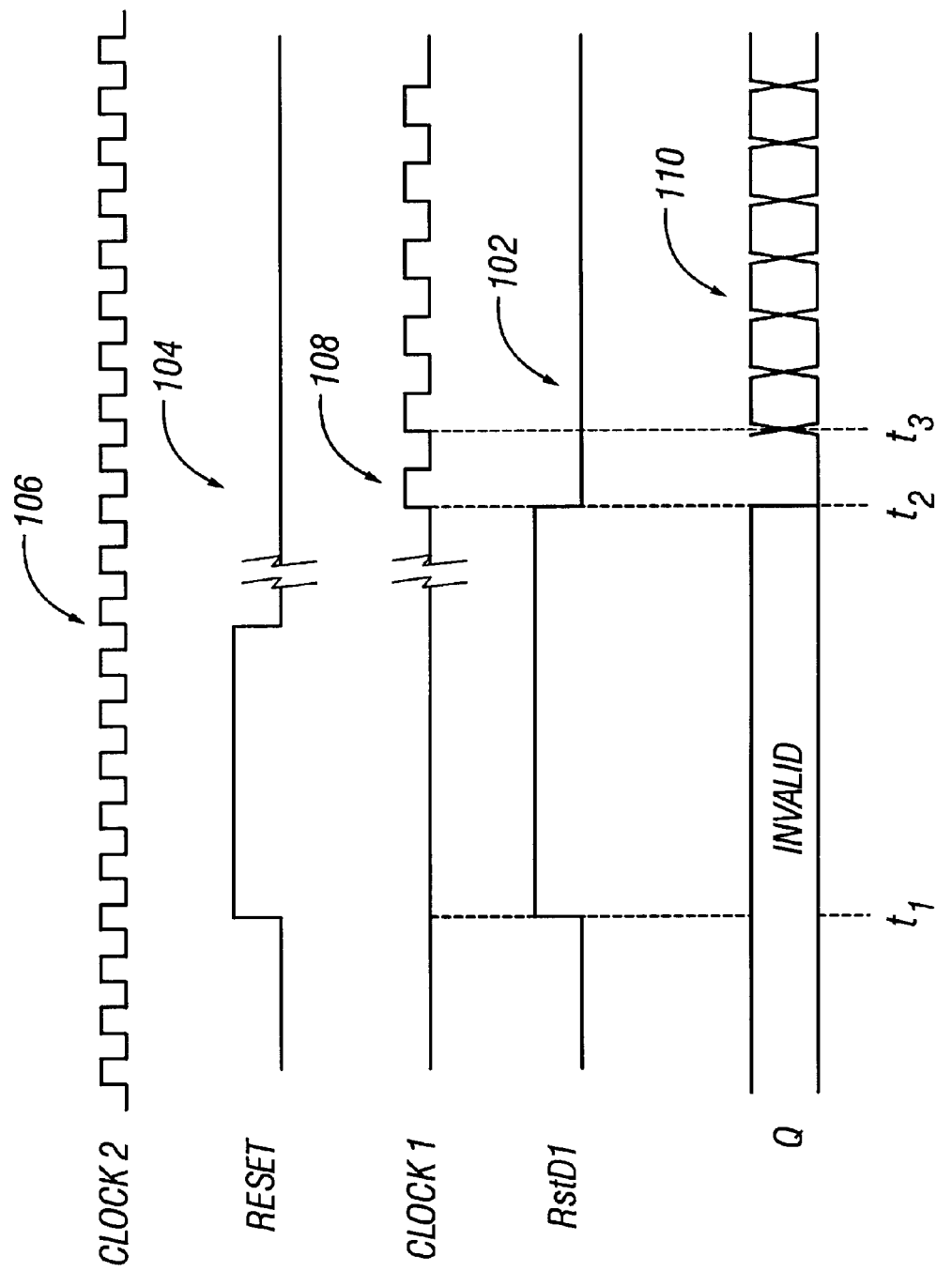
FIG. 5 is a diagram schematically illustrating waveforms representing the operation of the digital system in accordance with one embodiment of the present invention.

FIG. 5 schematically illustrates signal waveforms representing the operation of the digital system 50 in accordance with one embodiment of the present invention. As shown in FIG. 5, when the reset signal (Rest) 104 is provided, the first logic circuit 52 (in FIG. 4) sets the initialization signal (Rst D1) 102 at a first logic value, for example, "1", at time $t_1$ in response to the reset signal 104. For example, the initialization signal 102 is asserted when the first logic circuit 52 sees the rising edge of the reset signal 104. The reset signal 104 may be a simple reset pulse from the second clock domain, and the reset pulse may have duration for a selected number of cycles of the second clock signal (Clock2) 106. The initialization signal 102 is maintained at the first logic value at least until the first clock signal (Clock 1) 108 becomes active at time $t_2$. When the first clock signal 108 becomes active when the initialization signal 102 has the first logic value, the second logic circuit 54 is initialized in response to the active first clock signal 108.

As shown in FIG. 5, the first logic circuit may reset (or deactivate) the initialization signal 102 to a second logic value, for example, "0", in response to the active first clock signal 108. Such a resetting can be done by supplying logic "0" to a synchronous port of the first logic circuit 52, as shown in FIG. 4. The resetting to the second logic value may be in a first cycle of the active first clock signal 108. For example, the initialization signal 102 is deasserted when the first logic circuit 52 sees the rising edge of the active first clock signal 108. The output signal (Q) 110 of the second logic circuit has an invalid value until the second logic circuit is initialized at time $t_2$. After the initialization, when the second logic circuit 54 sees a rising edge of the active clock signal 108 at time t₃, the output signal 110 begins having the valid signal value in accordance with its logic function.

It should be noted that although the first logic circuit 52 is depicted as a flip-flop, it can be implemented as a series of asynchronous preset/reset flip-flops when the initialization signal pulse is kept for several clock cycles. For example, if the initialization signal 102 needs to be maintained for longer than one cycle of the active first clock signal 108, for example, due to the hold time requirement of the second logic circuit 54, the first logic circuit 52 can be implemented using a counter. Such a counter prolongs the initialization logic value for a required number of clock cycles of the active first clock signal 108.

Figure 6:
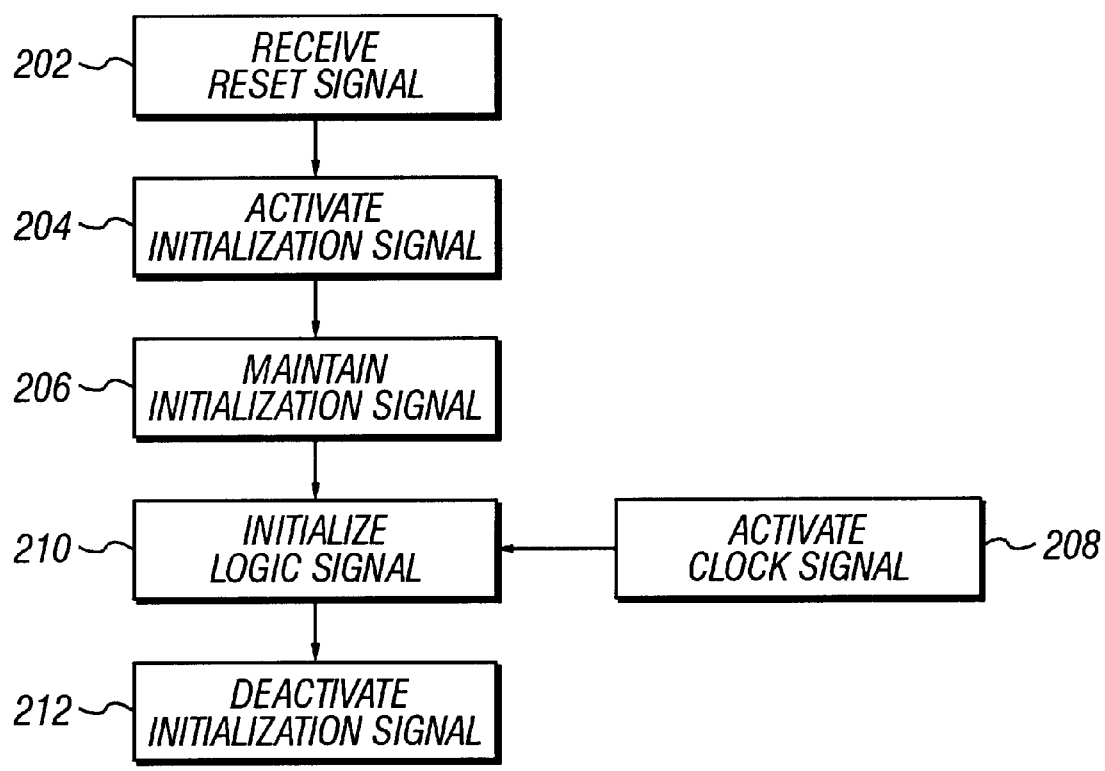
FIG. 6 is a process flow diagram schematically illustrating a method for synchronously initializing a digital logic circuit having a memory characteristic, in accordance with one embodiment of the present invention.

FIG. 6 schematically illustrates a method for synchronously initializing a digital logic circuit having a memory characteristic, in accordance with one embodiment of the present invention. The logic circuit is n a first clock domain controlled by a first clock signal, or included in a digital system in the first clock domain. The logic circuit includes a synchronous port for receiving an initialization signal, a clock port for receiving the first clock signal for the first clock domain, and a data output port. A typical example of such a logic circuit is a flip-flop.

First, a reset signal is received from a second clock domain other than the first clock domain (202). The second clock domain may be another circuit core on the same chip, another IC chip, or may be within the same circuit core as the first clock domain. The reset signal may have a single pulse with duration of a certain number of clock cycles of the second clock domain. Such a reset signal may be sent prior to data transmission from the second clock domain, or when the digital system is powered up. Typically, when the reset signal is received, the first clock signal for the first clock domain is not available to the digital logic circuit to be initialized. In response to the reset signal, an initialization signal is activated (204), and then maintained at least until the first clock signal becomes active (206). A digital logic circuit such as an asynchronous-reset flip-flop or FMS may be used to generate and maintain the initialization signal. When the first clock signal becomes active (208), using the maintained initialization signal, the digital logic circuit is initialized in response to the active first clock signal (210). The initialization signal is then deactivated in response to the active first clock signal (212).

The initialization signal retains its initialization logic value for a sufficiently long time period after the original reset signal is deactivated, and it works as a later-time-reset signal for the logic circuit. The logic circuit is typically initialized in the first cycle of the active clock signal when it sees the triggering edge of the active clock signal, for example, a rising edge. The initialization logic value, which is set in response to the reset signal, may be logic "1" and it may be reset (deactivated) to logic "0" in response to the active clock signal. Such deactivation may also be preformed in the first cycle of the active clock signal. Depending on the hold time requirement of the digital logic circuit, the initialization signal may be maintained active for more than one cycle of the active clock signal. Such a delayed deactivation may be implemented using a counter circuit.

By using the initialization logic circuit (typically an asynchronous flip-flop or FSM), digital logic circuits having a memory characteristic (typically flip-flops) in the same clock domain can be reset synchronously. This reduces design complexity for such digital logic circuits, bus wiring for the reset signal, and die area required for a circuit design.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for synchronously initializing a digital logic circuit having a memory characteristic, said logic circuit being in a first clock domain and including a synchronous port for receiving an initialization signal, a port for receiving a first clock signal for the first clock domain, and a data output port, said method comprising:

receiving a reset signal from a second clock domain;

activating the initialization signal in response to the reset signal;

maintaining the initialization signal active at least until the first clock signal becomes active;

initializing the digital logic circuit in response to the first clock signal when the first clock signal becomes active; and deactivating the initialization signal in response to the active first clock signal.

2. A method according to claim 1 wherein said activating includes:

setting the initialization signal at a first logic value in response to the reset signal.

3. A method according to claim 2 wherein said maintaining includes:

retaining the first logic value of the initialization signal at least until the first clock signal becomes active.

4. A method according to claim 3 wherein said deactivating includes:

resetting the initialization signal to a second logic value in response to the active first clock signal.

5. A method according to claim 1 wherein said initializing is performed in a first cycle of the active first clock signal.

6. A method according to claim 1 wherein said deactivating is performed in a first cycle of the active first clock signal.

7. A method according to claim 1 wherein in said maintaining, the initialization signal is maintained active for more than one cycle of the active first clock signal.

8. A digital system including a logic circuit having a memory characteristic, said digital system being in a first clock domain, said digital system comprising:

a first logic circuit including an asynchronous port for receiving a reset signal from a second clock domain, a port for receiving a first clock signal for the first clock domain, and an output port for providing an initialization signal, said first logic circuit setting the initialization signal at a first logic value in response to the reset signal and maintaining the first logic value at least until the first clock signal becomes active; and a second logic circuit including a synchronous port for receiving the initialization signal, a port for receiving the first clock signal, and a data output port outputting a data signal, said second logic circuit being initialized in response to the active first clock signal when the initialization signal has the first logic value.

9. A digital system according to claim 8 wherein said first logic circuit resets the initialization signal to a second logic value in response to the active first clock signal.

10. A digital system according to claim 9 wherein said first logic circuit resets the initialization signal to the second logic value in a first cycle of the active first clock signal.

11. A digital system according to claim 8 wherein said first logic circuit maintains the first logic value for more than one cycle of the active first clock signal.

12. A digital system according to claim 8, further comprising:
- a combinational logic circuit coupled between said first logic circuit and said second logic circuit, said combinational logic circuit receiving a data signal from a logic circuit in the second clock domain.

13. A digital system according to claim 8 wherein the first clock signal is a peripheral clock signal supplied from outside of the first clock domain.

14. An apparatus for synchronously initializing a digital logic circuit having a memory characteristic, said logic circuit being in a first clock domain and including a synchronous port for receiving an initialization signal, a port for receiving a first clock signal for the first clock domain, and a data output port, said apparatus comprising:
- means for receiving a reset signal from a second clock domain;
- means for activating the initialization signal in response to the reset signal;
- means for maintaining the initialization signal active at least until the first clock signal becomes active;
- means for initializing the digital logic circuit in response to the first clock signal when the first clock signal becomes active; and
- means for deactivating the initialization signal in response to the active first clock signal.

15. An apparatus according to claim 14 wherein said means for activating includes:
- means for setting the initialization signal at a first logic value in response to the reset signal.

16. An apparatus according to claim 15 wherein said means for maintaining includes:
- means for retaining the first logic value of the initialization signal at least until the first clock signal become active.

17. An apparatus according to claim 16 wherein said means for deactivating includes:
- means for resetting the initialization signal to a second logic value in response to the active first clock signal.

18. An apparatus according to claim 14 wherein said means for initializing performs in a first cycle of the active first clock signal.

19. An apparatus according to claim 14 wherein said means for deactivating performs in a first cycle of the active first clock signal.

20. An apparatus according to claim 14 wherein said means for maintaining maintains the initialization signal active for more than one cycle of the active first clock signal.

* * * * *